Aug. 14, 1928.
E. HERZOG
1,680,681
PROCESS OF TREATING SILICA ARTICLES
Filed Jan. 21, 1926
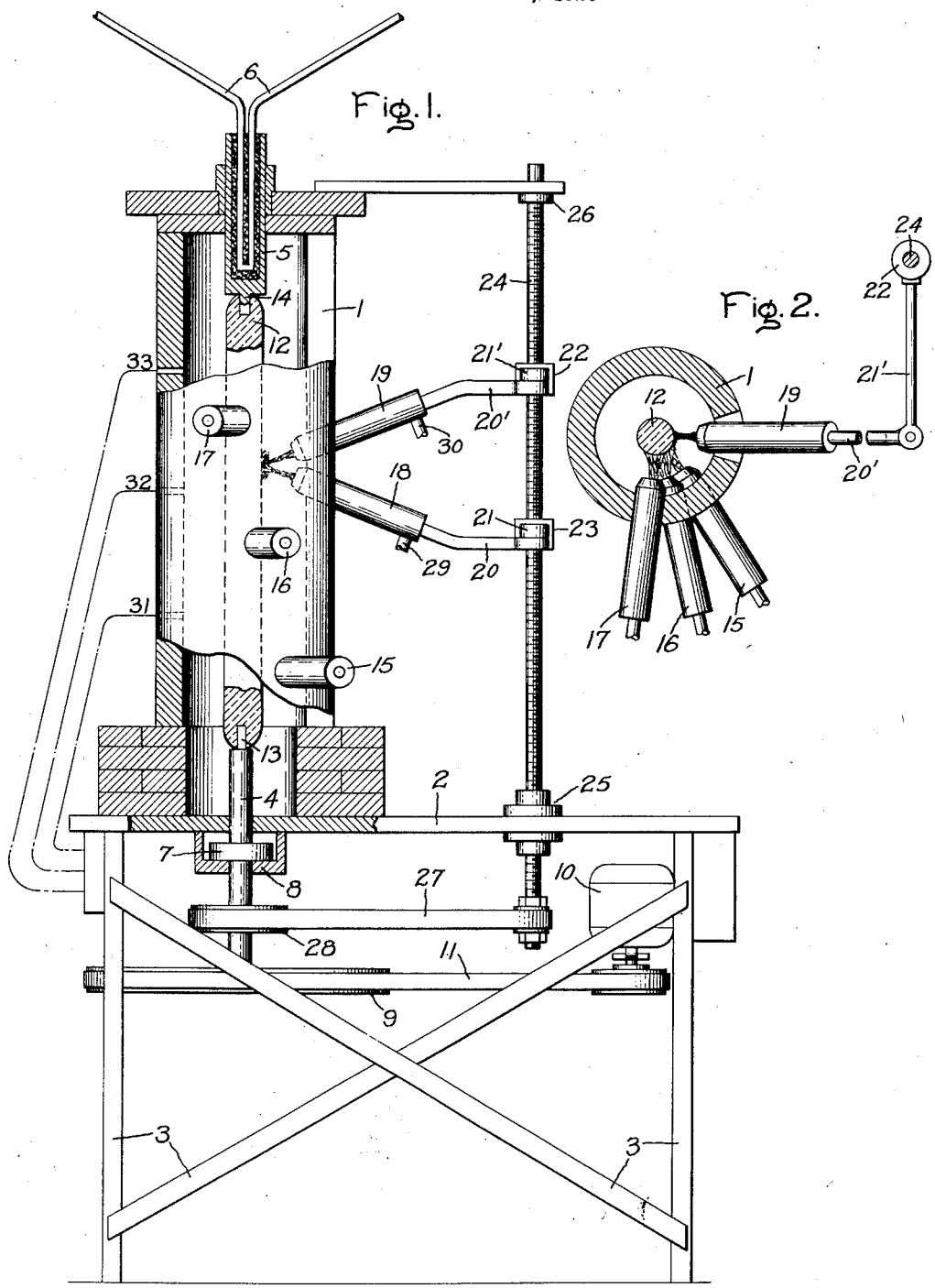
Inventor:
Eugene Herzog,
by
His Attorney.

Patented Aug. 14, 1928.

1,680,681

UNITED STATES PATENT OFFICE.

EUGENE HERZOG, OF LYNN, MASSACHUSETTS, ASSIGNOR TO GENERAL ELECTRIC COMPANY, A CORPORATION OF NEW YORK.

PROCESS OF TREATING SILICA ARTICLES.

Application filed January 21, 1926. Serial No. 82,824.

The present invention relates to the finishing or surfacing of articles consisting of vitreous silica, and its object is to glaze surfaces of articles when originally roughened or pitted, or to fill up cavities.

Heretofore, silica articles which had a surface layer of only partly fused material, such, for example, as the tubular bodies of silica produced by heating a resistance core in a mass of finely-divided silica, were finished by removing as much as possible of the surface layer and then subjecting the article to the heating effect of an electric arc or other high temperature heating source but without previously heating the article as a whole to a high temperature. The exceedingly low thermal-expansion coefficient of silica makes it possible to carry out this process with fair success when the silica articles are of small size, but even in that case, due to the very great difference in temperature of the fused and unfused material, strains are produced in the silica, as silica has an appreciable, although low, thermal-expansion coefficient. When the silica articles are of substantial size, it is necessary to carry out the glazing operation in several stages, which necessitates exposing the articles being glazed to the cooling effect of the air. The strains produced under these conditions are sufficient to cause the articles either to break or to cause chipping of their surfaces.

In accordance with my invention, these difficulties are avoided by heating the silica article as a whole to a high temperature in a closed receptacle and then subjecting the surface of the article progressively to a fusing temperature to produce the desired surface condition. The temperature to which the article is heated should be around 1000° C. An ambient lower temperature is insufficient, while a higher one causes recrystallization of the surface.

The accompanying drawing shows in Fig. 1 a side elevation of the apparatus suitable for carrying out my invention with the side wall of the furnace partly removed, and Fig. 2 is a cross sectional view of a furnace showing the relative position of the heating devices.

Referring to the drawing, the apparatus comprises a vertical tubular heating receptacle 1 consisting of fire brick or other suitable refractory material, this receptacle being mounted upon a platform 2 which is supported by a suitable supporting framework 3. Projecting into the heating chamber is a rotatable shaft 4 and a stationary shaft 5, the upper shaft 5 being artificially cooled as indicated by the cooling coil 6. The lower shaft 4 is provided with a suitable disc 7 resting upon the bearing surface 8 to receive the weight of the rotating members and the silica article and is also provided with a pulley wheel 9 which is rotated by an electric motor 10 through the intermediary of a belt 11. The speed of rotation should be low enough to avoid any deformation due to centrifugal force, 30 to 40 R. P. M. being the most suitable speed. The article to be rotated, which is indicated in the drawing as a cylindrical silica body 12, is secured to the shafts 4, 5, by small outwardly projecting bosses which enter holes provided in the ends of the silica article. It is heated by gas burners 15, 16, and 17, which are radially displaced and spaced apart along the length of the article to be heated. By the combustion of ordinary fuel gas the temperature of the surface within the inclosure 1 and in particular the temperature of the silica body 12 is raised to about 1000° C. A local fusing temperature can be produced upon the surface of the silica by a second set of burners 18, 19, which are tilted with respect to each other so that the flames from both burners converge upon a localized area of the surface of the article. These two burners are suitably mounted on supports 20, 21, and 20' and 21', suitably linked and terminating in threaded nuts 22, 23, engaging with a threaded shaft 24 which is supported upon bearings 25, 26 so as to be rotatable by means of a belt 27 passing over the pulley 28 on the lower shaft 4 which supports the silica article. As the threaded shaft 24 rotates, it imparts a vertical motion to the burners 18, 19, which is either upward or downward according to the direction of rotation of the shaft. These two burners are provided with gas capable of producing a fusing temperature, for example, hydrogen and oxygen, the gas ducts being indicated at 29, 30.

When the interior of the furnace and the silica article as a whole has been brought to the proper ambient temperature, as may be indicated by thermo-couples 31, 32, and 33, the fusing heat is applied to localized area of the surface by the burner 18, 19 as above indicated. By the described longitudinal travel of these burners in conjunction with the rotation of silica articles, the application of the fusing heat is progressively applied over the entire surface of the silica article, thereby fusing a surface layer without fusing the article as a whole. After the entire surface or any desired part of the surface has been glazed, the whole mass is annealed at a somewhat lower temperature and thereupon is slowly cooled to room temperature. When the silica article is removed from the furnace, the ends, which are somewhat contaminated by iron introduced from the bosses 13, 14, and which are imperfectly annealed and glazed due to the cooling effect of the shafts, are removed by well-known methods, leaving an article having the desired glazed surface conditions without expansion and contraction strains.

My invention also is applicable to the local repairs or building up of massive articles of vitreous silica. A defect in a body of silica first is prepared by grinding into a hollow, the whole body then is heated as above described, and small pieces of vitreous quartz are filled into the cavity by fusion under the blow pipe. The entire body of fused quartz then is slowly cooled, and if necessary, finished by grinding.

What I claim as new and desire to secure by Letters Patent of the United States is:

1. The preheating step in the fabrication of large silica articles which is preliminary to the application of a fusion temperature to the surfaces of said articles which consists in heating said articles to a temperature of about 1000° C.

2. The method of glazing an article of vitreous silica having a rough surface which consists in heating said objects in an enclosed space to a temperature of about 1000° C., heating a localized region of the surface of said article to a fusing temperature and changing the region of application of fusion temperature as soon as fusion of a surface layer occurs to another part of the surface.

3. The method of fabricating a massive silica article which consists in heating said article to an ambient temperature of about 1000° C., locally fusing the surface of said article while the article as a whole remains unfused and annealing said article before cooling occurs.

4. The method of glazing the surface of a massive silica article which consists in heating said article to about 1000° C. in an enclosed space, subjecting the surface layer thereof progressively to local fusion, annealing said articles in said enclosed space and finally cooling slowly to room temperature.

In witness whereof, I have hereunto set my hand this 19th day of January, 1926.

EUGENE HERZOG.